United States Patent
Hong

(10) Patent No.: US 6,571,293 B1
(45) Date of Patent: *May 27, 2003

(54) MULTIFUNCTION PERIPHERAL TO HOST COMMUNICATIONS

(76) Inventor: Tzuming Hong, 9740 Irvine Blvd., Irvine, CA (US) 92618

(*) Notice: Subject to any disclaimer, the term of this patent is extended or adjusted under 35 U.S.C. 154(b) by 0 days.

This patent is subject to a terminal disclaimer.

(21) Appl. No.: 09/266,196

(22) Filed: Mar. 10, 1999

Related U.S. Application Data

(63) Continuation of application No. 08/800,831, filed on Feb. 13, 1997.

(51) Int. Cl.[7] .............................................. G06F 15/16
(52) U.S. Cl. ...................................... 709/232; 710/100
(58) Field of Search ................................ 709/236, 230, 709/234, 232; 358/1.15; 710/100, 68

(56) References Cited

U.S. PATENT DOCUMENTS

| | | | |
|---|---|---|---|
| 5,175,822 A | 12/1992 | Dixon et al. | |
| 5,454,085 A | 9/1995 | Gaijar et al. | |
| 5,469,453 A | 11/1995 | Glider et al. | |
| 5,471,586 A | 11/1995 | Sefidvash et al. | |
| 5,519,883 A | 5/1996 | White et al. | |
| 5,537,626 A | 7/1996 | Kraslavsky et al. | |
| 5,586,268 A | 12/1996 | Chen et al. | |
| 5,689,730 A | * 11/1997 | Wakasugi | 370/392 |
| 5,751,923 A | * 5/1998 | Matsuzawa | 710/1 |
| 5,870,394 A | * 2/1999 | Oprea | 370/392 |
| 5,903,733 A | * 5/1999 | Hong | 709/232 |

FOREIGN PATENT DOCUMENTS

| | | | | |
|---|---|---|---|---|
| GB | 2311701 A | * 3/1997 | ............ | H04L/12/56 |
| JP | 02 188887 A | 7/1990 | | |
| JP | 07-298014 | * 10/1995 | ............ | H04N/1/21 |

OTHER PUBLICATIONS

"Lexmark International Introduces "Two Headed" Color Inkjet Printer For Under $200", Nov. 4, 1996, http://www.lexmark.com/US/press_release/details/0,1233, MzQ4fDE=,00.html.*

Marketing documents related to RICOH Lan XP, Nov. 1996.

Marketing documents related to CANON GP 200F, Nov. 1996.

Marketing documents related to CANON GP 30F, Nov. 1996.

(List continued on next page.)

Primary Examiner—Mark Powell
Assistant Examiner—Eric T. Hunt
(74) Attorney, Agent, or Firm—Arter & Hadden LLP

(57) ABSTRACT

A data processing system comprising a single Host coupled by a communications channel to a single multifunction peripheral is disclosed. The multifunction peripheral comprises a paper tray, a display, a user input device, a processor, a first memory for long term storage and a second rewritable memory for short term storage, a communications interface, the multifunction peripheral for providing document scanning and hard output functions. The Host comprises a processor, a first rewritable memory for long term storage and a second rewritable memory for short term storage, a communications interface, and a network adapter for communicating with a computer network. The communications channel coupling the communications interface of the multifunction peripheral and the communications interface of the Host. Data is transferred efficiently between the Host and the multifunction peripheral using the SCSI-2 standard by combining a header and content into a single packet and transmitting the packet using a SEND MESSAGE or GET MESSAGE command.

22 Claims, 5 Drawing Sheets

OTHER PUBLICATIONS

Marketing documents related to KONICA 7050, 7728, 9715PP, 9615FP, MD System, QScan Film Scanner, EV–Jetcolor, Nov. 1996.

Technical documents related to Small Computer System Interface—2, Nov. 7, 1993.

R. Lutz; "Multi–Function Peripheral Interface Standard (MFP) PN–1906 Strawman Working Document"; Telecommunications Industry Association Apr. 19, 1994, XP002067674.

Technical documents related to Multifunction Peripheral Interface Standard, Level 1, Apr. 9, 1996.

* cited by examiner

MULTIFUNCTION PERIPHERAL TO HOST COMMUNICATIONS

This is a continuation of application Ser. No. 08/800,831 filed on Feb. 13, 1997.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to multifunction peripheral devices and more particularly to increasing the efficiency of communication to a multifunction peripheral device by increasing the performance and efficiency of the multifunction peripheral interacted and its interface protocol.

2. Description of Related Art

In a typical networked multi-user computer environment, a number of individual workstations are linked together through a network, usually a local area network (LAN). Also linked on the LAN are one or more peripheral devices such as printers or plotters. Traditionally, each peripheral device was dedicated to single function. Hence, although documents coming from a facsimile machine contained text and graphics that could be virtually identical to documents coming from a printer, separate machines were used for each of these functions. Furthermore, some functions were performed entirely off line with respect to the network. Thus users who wished to send a document via facsimile might be required to first print out the document, then hand carry it to a facsimile machine, punch in or otherwise select a phone number, and then feed the printed document through the fax machine. Similarly, those who wished to make multiple copies of a document might print out a single copy, carry it to a photocopying machine, and feed the pages to the photocopy machine which could make, and perhaps collate multiple copies.

This earlier generation of devices tended to be "unintelligent," or perhaps, better "uncommunicative." They accepted data in accordance with whatever means they had available, and processed it according to instructions.

More recently, however, peripheral devices have become available which are able to perform a number of related functions. These devices are known as multifunction peripherals (MFPs).

The Telecommunication Industry Association (TIA) has provided an MFP interface standard known as the IS-650 Multifunction Peripheral Industry Interface Standard, Level 1 (MFPI-1) specification version 5.5. According to this standard, an MFP is:

Computer equipment used to scan, print, facsimile transmit, and/or copy documents. It also may have the capability to provide data modem and other voice telephony services. The MFP may be an integrated unit or may be several discrete units that are interconnected on the same communication channel to the Host or interconnected using several different channels. One or more of the subsystems may be omitted from the MFP.

A "Host" is any terminal or computer capable of providing commands and data to operate a peripheral. In practice, a Host is a computer of any size, or a group of network nodes on a given local area network. A "subsystem" is one of several logical peripheral units, such as printer, scanner, fax-data-voice (FDV) modem, internal memory, stand-alone controller (SAC), operator console and others which may exist in the MFP. The Host and the MFP communicate through a "channel."

MFPI-1 organizes the subsystems as components on the channel. The channel also has a resource management component which manages the subsystems from a supervisory level. The languages which are used to control the subsystems, such as printer page description languages, fax/data/voice modem languages, and scanner languages are not within the scope of the standard. MFPI-1 also allows multiple subsystems of the same type (two printers for example), and does not constrain the number or type of subsystems included within an MFP.

An MFP can operate in stand-alone mode, wherein two or more subsystems are used without interaction with the Host. One example of this is copying. Stand-alone operations may occur at the same time that the Host is accessing a different subsystem for a Host-controlled operation.

The channel used to access the MFP is not restricted by MFPI-1. However, MFPI-1 provides information for operations utilizing various channels such as the Bidirectional Parallel (IEEE-1284), Asynchronous Serial (EIA/TIA-RS-232-E), and Small Computer Systems Interface (SCSI) channels. The SCSI architecture, for example, allows up to eight devices on the bus (including a SCSI host). MFPI-1 specifies that the Host and MFP are each one such device, and that other MFPs can be coupled to a single SCSI bus. MFPI-1 is generally limited to a single SCSI host on a given channel. Channel issues such as identification of the SCSI host requesting service if multiple SCSI hosts are to be connected are said to be beyond the scope of MFPI-1. MFPI-1 does, however, suggest that a given channel architecture, such as SCSI, may provide for multiple SCSI hosts.

In a networked system where many workstations are sharing peripherals, the use of a multifunction peripheral is a mixed blessing. On the one hand, rather than providing, for example, two different scanner functions (one for reading documents for facsimile transmission, one for reading documents for copying) and three different printing functions (one for printing computer generated documents, one for printing documents received through facsimile transmission, and one for printing documents that have been scanned in for copying), a single scanning function and a single printing function perform the work of printer, copier and facsimile machine. On the other hand, the single multifunction peripheral may become a bottleneck. Previously, where there was one user wishing to print a document, one user wishing to transmit a document via facsimile, and one user wishing to copy a document, each would ordinarily each have directed his or her task to a separate machine, and thus not interfere with one another. With a single machine performing all three functions (in our example), queues will more readily form in order to make use of those functions. Hence, it is desirable to achieve any efficiencies possible in the MFP interface and interface protocol in order to enhance the performance of the MFP.

Since the channel carries all data and commands between the Host and MFP, this link is critical to the performance of the MFP. Where the channel is a SCSI channel, by increasing the efficiency of use of the SCSI channel and its protocol, the MFP's performance is also enhanced.

The SCSI protocol allows packets of data to be sent from the Host to the MFP and from the MFP to the Host. However, under MFPI-1, only the Host can initiate data transfers. (The ANSI SCSI specification actually allows peer-to-peer communications, but few SCSI adapters do this.) Furthermore, MFPI-1 describes only a limited command set, although this command set is similar to the SCSI standard command set for communications devices.

Under MFPI-1, the SCSI protocol's operating procedure has two phases in each direction, known as the "Header Phase" and the "Content Phase." This two-phase approach is specified by MFPI-1 out of conformance with normal SCSI implementation and also to protect against faults. In the Header Phase; the Host transfers a header, which is a small fixed length amount of data which describes the actual data to be sent during the Content Phase. In the Content Phase, the Host transfers packets of information (called "content") to the MFP. Data transfer from the MFP to the Host operate in a similar fashion. Data transfers from the Host to the MFP, including transfers of header and content, are sent by the Host using the SEND MESSAGE command. The Host retrieves data from the MFP using the GET MESSAGE command.

The format for the SEND MESSAGE command is reproduced in the table below.

| Bit<br>Byte | 7 | 6 | 5 | 4 | 3 | 2 | 1 | 0 |
|---|---|---|---|---|---|---|---|---|
| 0 | Operation Code (0Ah) ||||||||
| 1 | Reserved (00h) ||||||||
| 2 | Reserved (00h) ||||||||
| 3 | Reserved (00h) ||||||||
| 4 | HostID (Stream Selection MSB) ||||||||
| 5 | UnitID (Stream Selection LSB) ||||||||
| 6 | (MSB) ||||||||
| 7 | TransferLength ||||||||
| 8 | (LSB) ||||||||
| 9 | Header Phase | Vendor Spec | Reserved |||| Flag | Link |

The SEND MESSAGE command includes the TransferLength field. The TransferLength field is three bytes in length and specifies the length of the header or content packet to be sent.

The format for the GET MESSAGE command is reproduced in the table below.

| Bit<br>Byte | 7 | 6 | 5 | 4 | 3 | 2 | 1 | 0 |
|---|---|---|---|---|---|---|---|---|
| 0 | Operation Code (08h) ||||||||
| 1 | Reserved (00h) ||||||||
| 2 | (MSB) ||||||||
| 3 | AllocationLength ||||||||
| 4 | (LSB) ||||||||
| 5 | Header Phase | Vendor Spec | Reserved || NACA | Flag | Link |

The GET MESSAGE command includes the AllocationLength field. The AllocationLength field is three bytes in length and specifies the length of the header or content packet to be sent.

SCSI data packets, for the GET MESSAGE and SEND MESSAGE commands, have a format defined by MFPI-1 and are described in Section 13.4.5 of MFPI-1. The packet header is formatted as shown in the following table. This header is transmitted as data as part of a SEND MESSAGE or GET MESSAGE command. Bytes 0–5 are general in nature. Bytes 6–12 refer to the transmit direction for the channel. Bytes 13–17 refer to the receive direction for the channel. All eighteen bytes are mandatory in every header. The use of many of the fields is optional.

| Bit<br>Byte | 7 | 6 | 5 | 4 | 3 | 2 | 1 | 0 |
|---|---|---|---|---|---|---|---|---|
| 0 | No Content | Content Chk Valid | Control Content | ProtocolMode (0) ||| Reserve | Reserve |
| 1 | HeaderLength (18) ||||||||
| 2 | HeaderCheckValue ||||||||
| 3 | HostID ||||||||
| 4 | UnitID ||||||||
| 5 | PacketNumber ||||||||
| 6 | Reserved ||||||||
| 7 | EOF | ApplicationFlags |||||||

| 8  | (MSB) | | | | | |
|----|-------|--|--|--|--|--|
| 9  | TransmitContentLength | | | | | |
| 10 | (LSB) | | | | | |
| 11 | (MSB) | TransmitContentCheckValue | | | | |
| 12 | (LSB) | | | | | |
| 13 | FlowOn | FlowOff | ACK | NAK | Allowed Length Valid | Reserved |
| 14 | ReceiveRefPacketNumber | | | | | |
| 15 | (MSB) | | | | | |
| 16 | ReceiveAllowedLength | | | | | |
| 17 | (LSB) | | | | | |

The field, "TransmitContentLength" is three bytes long and specifies the length of the content packet to be transferred.

It is therefore the object of the invention to enhance the performance of the MFP. It is a further object to achieve efficiencies in the MFP interface. It is a further object to achieve efficiencies in the MFP interface protocol.

SUMMARY OF THE INVENTION

The previously described objects are achieved in a data processing system comprising an MFP and a Host wherein communications between the Host and MFP are refined through an improved SCSI communications channel.

According to the invention, data transfers from the Host to the MFP are expedited. When the Host has data to transfer to the MFP, the Host executes a single SEND MESSAGE command and sends both the header and the content to the MFP. When the MFP has data to transfer to the MFP, a single GET MESSAGE command is executed and the MFP sends both the header and the content to the Host.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
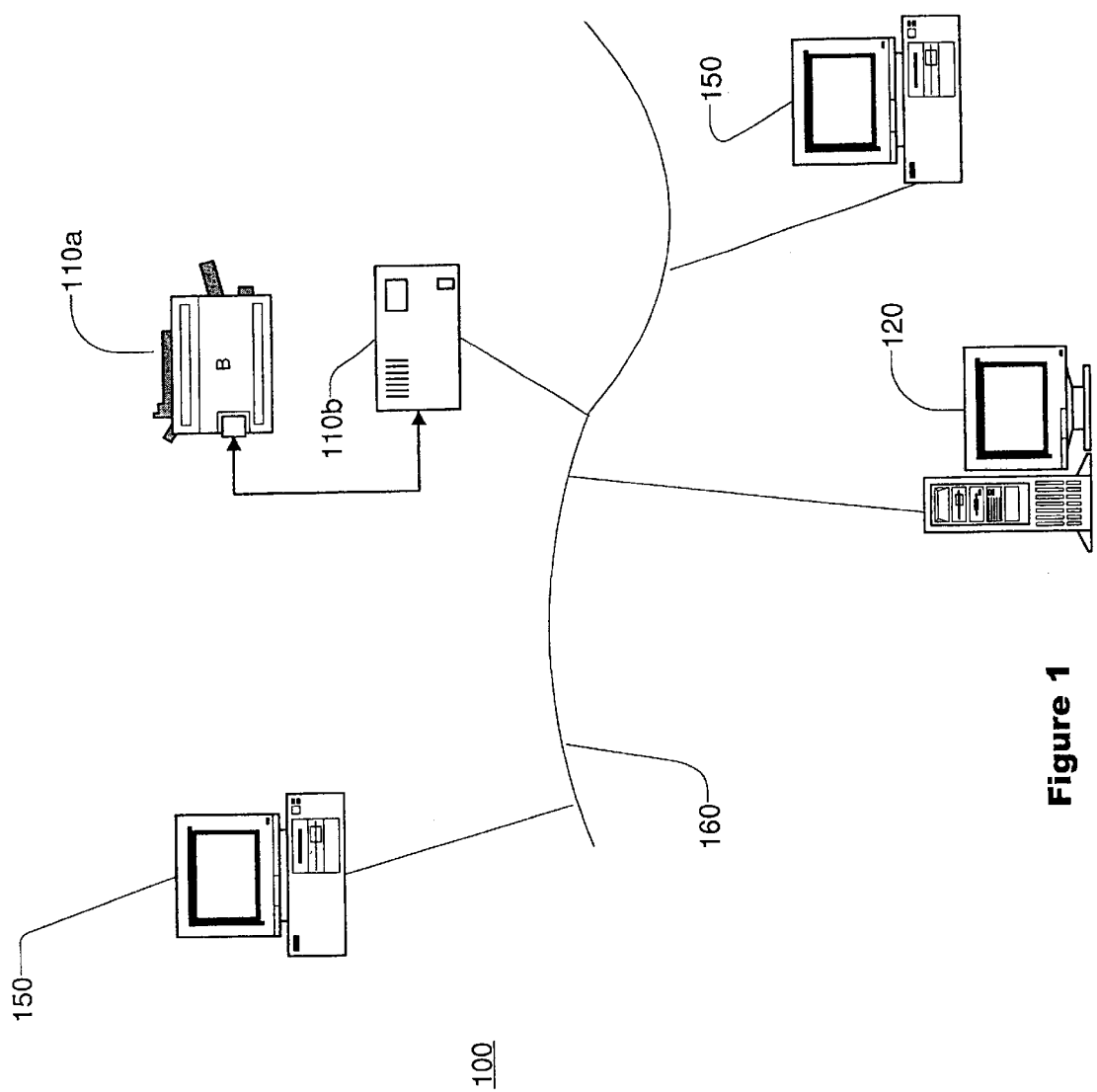
FIG. 1 is a block diagram of a LAN including plural MFPs in accordance with the invention.

Referring now to FIG. 1, there is shown a block diagram of a LAN 100 in accordance with the invention. The LAN 100 includes a file server 120, workstations 150, and a Host 110b coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows operating systems. An MFP 110a is coupled to the Host 110b. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing.

Figure 2:
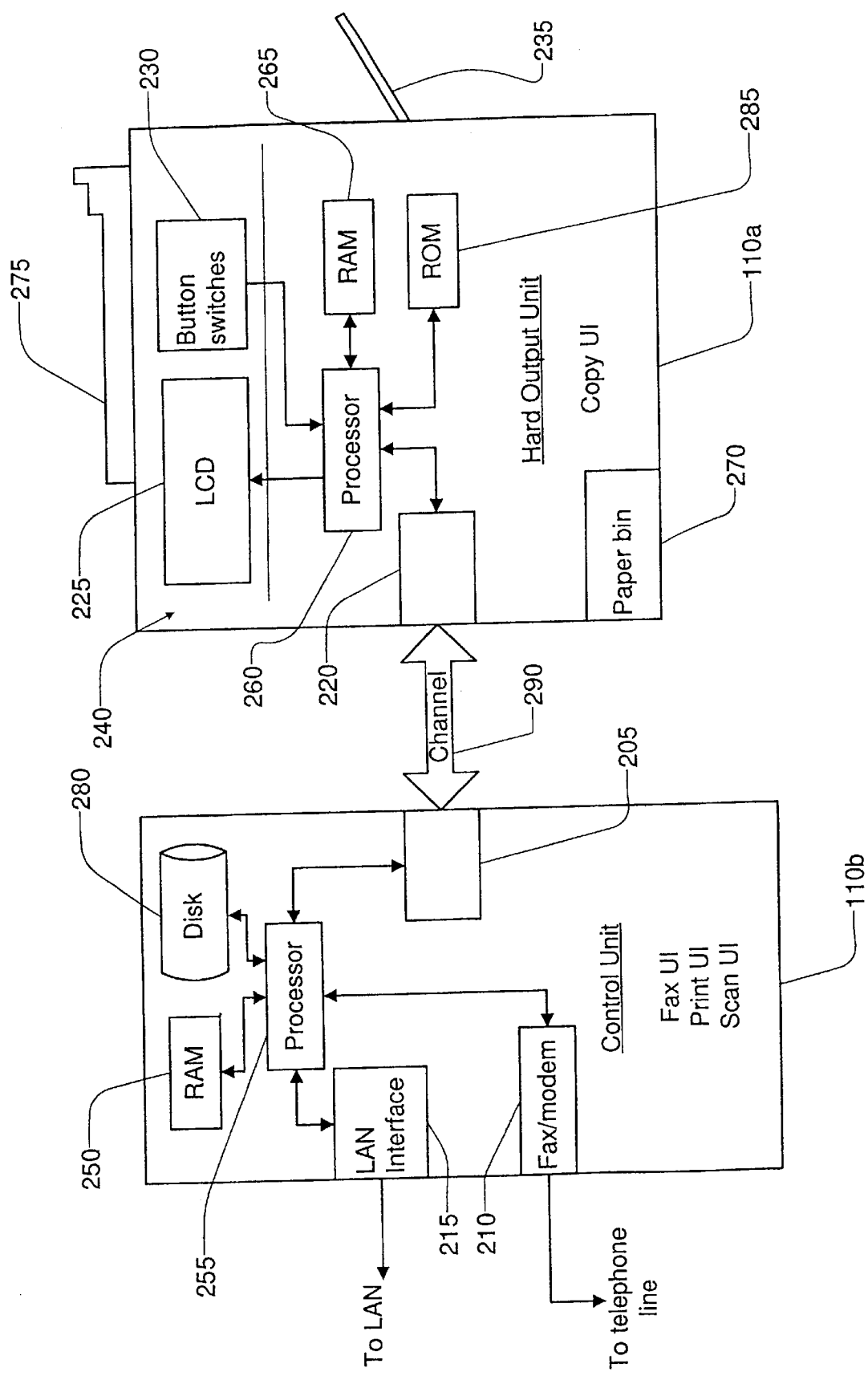
FIG. 2 is a block diagram of a data processing device including a Host and an MFP in accordance with the invention.

Turning now to FIG. 2, there is shown a block diagram of the data processing system comprising the MFP 110a and the Host 110b. The MFP 110a preferably comprises a high output digital copier having a communications interface 220 (preferably SCSI) and a hardware and software interface which allows the MFP 110a to receive rasterized print jobs from the Host 110b, manage the print jobs as well as its own copy jobs, and print the print jobs. The hardware includes a short term memory 265 (preferably RAM) and processor 260 in which programs are stored and run, respectively, for controlling the functions of the MFP 110a. The MFP 110a preferably also includes a long term memory 285 such as a ROM or EPROM. The MFP 110a may also include a disk drive (not shown) for both long term and short term storage. The MFP 110a includes standard components including automatic document feeder 275, paper bin 270 and paper output tray 235.

The MFP 110a includes a non-fixed display 225, preferably an LCD, and user input device 230, such as button switches. The MFP 110a has user interface software stored in the memory 285 which is responsible for displaying information on the display 225 and interpreting user inputs from the user input device 230.

The Host 110b preferably comprises a server such as a computer having an Intel processor (255) and running Microsoft Windows NT. As explained below, to maximize efficiency, there is preferably a one-to-one correspondence between Hosts and MFPs. In conjunction with the processor 255, the Host 110b has a short term memory 250 (preferably RAM) and a long term memory 280 (preferably a hard disk) as known in the art. The Host 110b further includes a communications interface 205 through which the Host 110b communicates with the MFP 110a through a channel 290. Preferably, the communications interface 205 is configured as a SCSI host. The Host 110b further preferably includes a fax/modem 210 for sending and receiving faxes via telephone lines. The Host 110b includes management software stored in the long term memory 280 for managing print jobs, fax jobs and scan jobs. The Host 110b rasterizes print jobs from the LAN 100 into print data (a form native to the MFP 110a) and transmits the print data to the MFP 110a via the communications interface 205.

Figure 3:
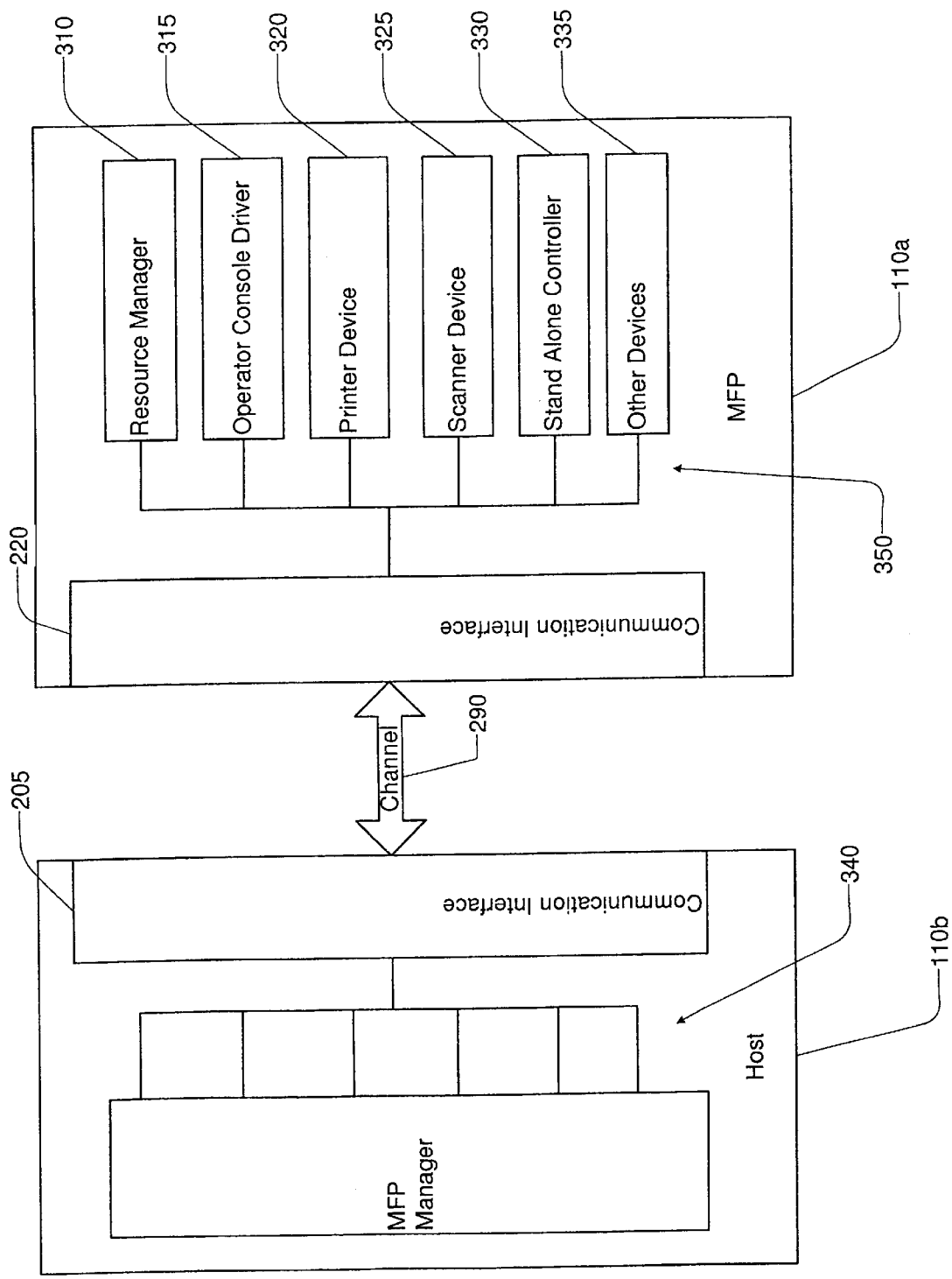
FIG. 3 is an alternative block diagram of the data processing device of FIG. 2.

Referring now to FIG. 3, there is shown an alternate view of the data processing system of FIG. 2. The MFP 110a includes seven functional subsystems: resource manager 310, operator console device 315, printer device 320, scanner device 325, stand alone controller 330 and other devices 335. Because there is a single MFP, there is no need to "save" device addresses for additional devices. While there is only a single physical device, there are up to seven logical devices, each separately addressable. Each of the functional subsystems 310, 315, 320, 325, 330 and 335 is preferably assigned a unique logical unit number (LUN). Where the communications channel 290 is SCSI, then each functional subsystem 310, 315, 320, 325, 330 and 335 has a unique SCSI logical unit number. Thus, each of these functional subsystems is a logical SCSI device. Since SCSI provides for up to seven devices coupled to a host, up to seven of the MFP's functional subsystems may be given a logical unit number and communicated to via logical channels 350.

Complementary to this, the MFP manager of the Host 110b is configured to communicate with each of the functional subsystems 310, 315, 320, 325, 330 and 335 as if they were separate physical devices on the SCSI channel 290. Thus, the Host 110b also utilizes plural logical channels 340 complementary to those 350 of the MFP 110a. The following tables shows one way to allocate LUNs in accordance with the invention.

| LUN | Direction | Contents | Destination/Subsystem |
|---|---|---|---|
| 0 | Receive | Data/Status | Operator Console |
| 1 | Send | Command/Data | Operator Console, Resource manager, Printer, Scanner, SAC |

-continued

| LUN | Direction | Contents | Destination/Subsystem |
|---|---|---|---|
| 2 | Receive | Data/Status | Resource Manager |
| 3 | Receive | Data/Status | Printer |
| 4 | Receive | Data/Status | Scanner |
| 5 | Receive | Data/Status | SAC |
| 6 | Receive | Device & Job events | Printer |
| 7 | Receive | Device & Job events | Scanner |

When the Host 110b transmits data for one of the MFP's subsystems 310, 315, 320, 325, 330 and 335, the transmission identifies the subsystem by SCSI logical unit number. This eliminates the need to decode a complex command from the Host 110b which would otherwise identify the peripheral function. This allows the Host 110b to efficiently communicate with each logical device independently. This also eliminates the need to incorporate a packet routing scheme in the MFP 110a, since packets can be addressed to the desired logical unit using existing SCSI protocols.

The Host 110b, to communicate with any one of the subsystems 310, 315, 320, 325, 330 and 335 simply uses standard SCSI communications methods as if the desired functional subsystem were a separate physical device. The communications interface 220 of the MFP 110a interprets the communications from the Host 110b and directs the communications to the appropriate functional subsystem 310, 315, 320, 325, 330 and 335 according to the indicated LUN. This results in a simple and fast method of routing Host-to-MFP communications to the appropriate MFP functional subsystem.

Figure 4:
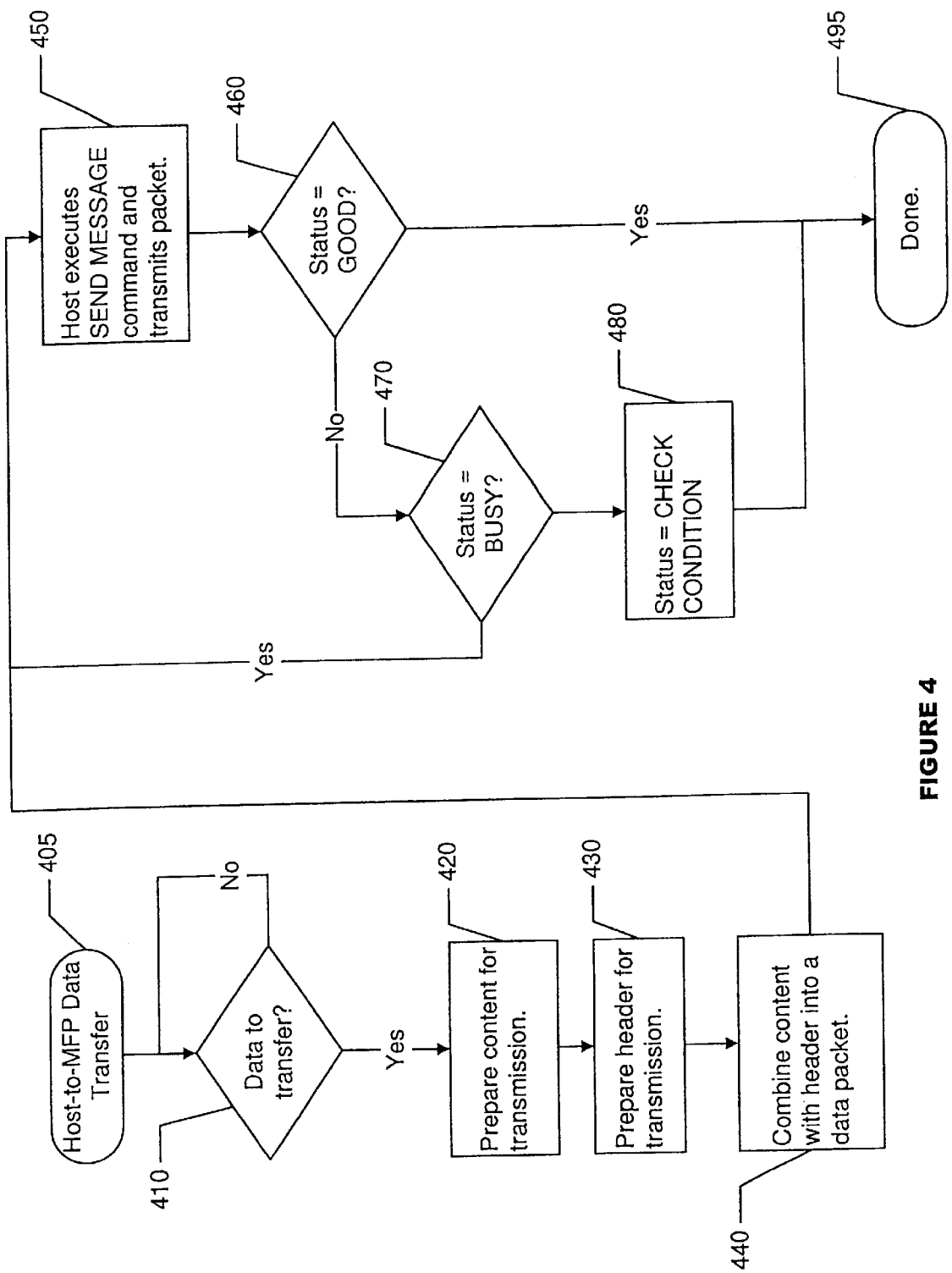
FIG. 4 is a flow chart of the Host-to-MFP data transfer process.

Referring now to FIG. 4, there is shown a flow chart of the Host-to-MFP data transfer process. In a first step, the process begins (step 405). If there is data to send (step 410), the Host 110b prepares the data for transmission (step 420). In particular, the Host 110b forms the data into SCSI content. At this point, the Host 110b also prepares a header for transmission (step 430).

However, the data processing system of the invention does not send the header first, awaiting confirmation of receipt and sending the content next as is specified in MFPI-1. Since there is only one MFP 110a coupled to the Host 110b, there is no need to consider bus contention by other devices. Instead, as shown in the following table, the header and content are combined into a single data packet (step 440). This is also possible because the MFP 110a, unlike a hard disk, does not need to be warned about a data transfer as would a hard disk.

| MFPI Header (18 bytes) | Content: command or data |
|---|---|

As described above, MFPI-1 specifies the header's format and its length (eighteen bytes). Preferably, this is not modified. The header preferably specifies the content length in the "TransmitContentLength" field.

The total size of the packet, comprising the eighteen-byte header plus the content, is specified in "TransferLength" of the SEND MESSAGE command's descriptor block.

The SEND MESSAGE command is then executed and the data packet sent to the MFP 110a (step 450). If the MFP 110a received the packet, the MFP 110a responds with a status of GOOD (step 460), and the data transfer from the Host 110b to the MFP 110a is complete (step 495). However, if the status is BUSY (step 470), then the Host 110b retries the transfer (step 450). A BUSY status usually arises when the MFP's SCSI buffer is inadequate to receive the packet, for example because the buffer is full. Otherwise, the status is CHECK CONDITION. This signifies that there is a major problem such as a bad SCSI command or hardware error or the HeaderCheckValue was wrong.

Figure 5:
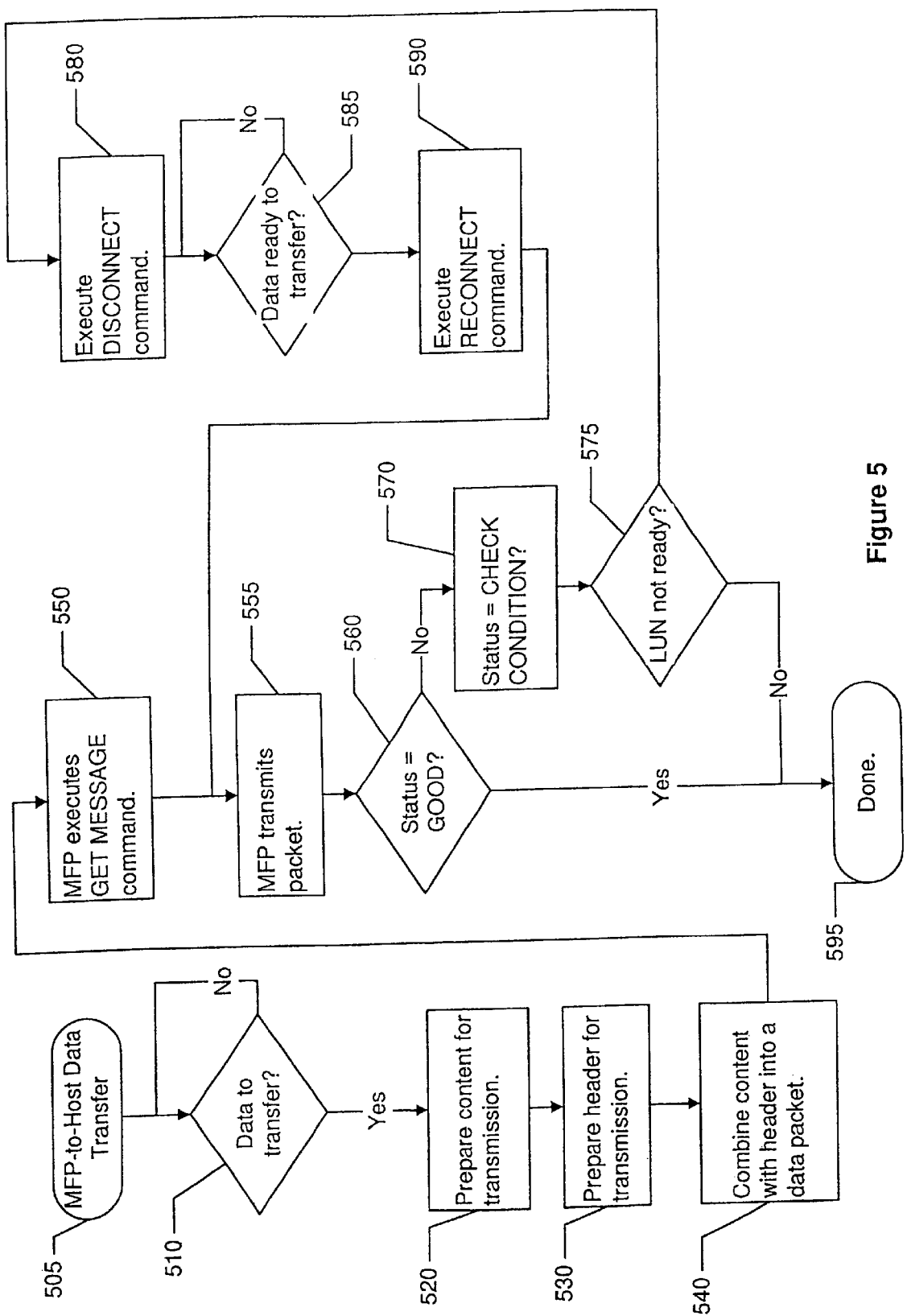
FIG. 5 is a flow chart of the MFP-to-Host data transfer process.

Referring now to FIG. 5, there is shown a flow chart for an MFP-to-Host data transfer. In a first step, the process begins (step 505). If there is data to send (step 510), the MFP 110a prepares the data for transmission (step 520). In particular, the MFP 110a forms the data into SCSI content. At this point, the MFP 110a also prepares a header for transmission (step 530).

The GET MESSAGE command is then executed (step 550). The size of a packet is specified in "Allocation Length" of the GET MESSAGE command's descriptor block. The MFP 110a also sends the data packet to the Host 110b. If the Host 110b received the packet, the Host 110b responds with a status of GOOD (step 560), and the data transfer from the MFP 110a to the Host 110b is complete (step 595). However, if the Host 110b had some problem in completing the task, the status is CHECK CONDITION (step 570). If the relevant LUN was not ready to send the data (step 575), then the MFP 110a executes the SCSI DISCONNECT command (step 580). When the data becomes ready (step 585), the MFP 110a executes the SCSI RECONNECT command (step 590) and transmits the data (step 555).

Polling of the MFP 110a by the Host 110b is therefor obviated. The inventors have found that this substantially reduces the burden on both the Host 110b and the MFP 110a. In addition, the inventors have found that this process provides better performance than the polling process specified in MFPI-1.

As a further enhancement, in accordance with the invention, a number of header+content combinations are sent in a single packet. The maximum size of a such a packet, termed a "combination" packet, is the maximum packet size. Since AllocationLength and TransferLength are three bytes in length, the maximum packet size is $2^{24}$ bytes. The size of each content is specified in "TransmitContentLength" of its header. The size of a packet is specified in "TransferLength" of the SEND MESSAGE command's descriptor block or "AllocationLength" of GET the MESSAGE command's descriptor block. There is nothing in a header that shows this packet contains multiple "header +content" parts, the receiver has to check the type of packet by comparing the size specified in the SCSI command descriptor block and the size specified in MFPI-1 header.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A data processing system comprising a single Host coupled by a local I/O communications channel to a single multifunction peripheral, the system comprising:

the multifunction peripheral comprising a display, a user input device, a processor, a first memory for long term storage and a second rewritable memory for short term storage, and a communications interface, the multifunction peripheral for providing document scanning and document output functions;

the Host comprising a processor, a first rewritable memory for long term storage and a second rewritable memory for short term storage, a communications interface, and a network adapter for communicating with a computer network;

the communications channel comprises one of the group consisting of Bidirectional Parallel and Asynchronous Serial, and the Host including means for determining when it has data to transfer to the multi function peripheral, and means for executing a single SEND MESSAGE command before the Host transmits a combined data packet, coupling the communications interface of the multifunction peripheral and the communications interface of the Host;

the Host including software for causing the processor in the Host the communications interface in the Host to:
(i) prepare a first content packet from the data for transmission to the multifunction peripheral;
(ii) prepare a first header packet containing information describing the first content packet;
(iii) combine the first content packet with the first header packet into the combined data packet;
(iv) transmit the combined data packet in a single transaction to the multifunction peripheral via the communications channel;

the multifunction peripheral including software for causing the processor in the multifunction peripheral and the communications interface in the multifunction peripheral to:
(i) receive the combined data packet from the Host;
(ii) send an acknowledgment of receipt of the combined data packet to the Host via the communications channel.

2. The data processing system comprising a single Host coupled by a communications channel to a single multifunction peripheral as set forth in claim 1 wherein the multifunction peripheral comprises plural functional subsystems.

3. The data processing system comprising a single Host coupled by a communications channel to a single multifunction peripheral as set forth in claim 2, wherein the communications channel provides for a range of logical unit numbers for devices using the communications channel, each functional subsystem is assigned a distinct logical address, and the Host includes one of the logical addresses in the first header packet portion of the combined data packet, whereby the multifunction peripheral is able to internally route the received content data to the functional subsystem thereby addressed.

4. The data processing system comprising a single Host coupled by a communications channel to a single multifunction peripheral as set forth in claim 1, the software in the multifunction peripheral further for causing the processor in the multifunction peripheral and the communications interface in the multifunction peripheral to, if the multifunction peripheral is unable to accept the combined data packet, then send a message of inability to receive the combined data packet to the Host via the communications channel;

the software in the Host further for causing the processor in the Host and the communications interface in the Host to:
receive the message of inability to receive the combined data packet from the multifunction peripheral, and
retry transmitting the combined data packet in a single transaction to the multifunction peripheral via the communications channel.

5. The data processing system comprising a single Host coupled by a communications channel to a single multifunction peripheral as set forth in claim 1:
   the software in the Host further for causing the processor in the Host and the communications interface in the Host to:
   (a) prepare a second content packet from the data for transmission to the multifunction peripheral;
   (b) prepare a second header packet containing information describing the second content;
   (c) combine the second content packet with the second header packet into the combined data packet for transmission in the single transaction to the multifunction peripheral with the first header and the first content.

6. The data processing system comprising a single Host coupled by a communications channel to a single multifunction peripheral as set forth in claim 1 wherein the multifunction peripheral comprises plural functional subsystems, the functional subsystems including an operator console, a resource manager, a printer and a scanner.

7. The data processing system comprising a single Host coupled by a communications channel to a single multifunction peripheral as set forth in claim 1, the software in the Host further for causing the processor in the Host and the network adapter in the Host to receive the content data from the computer network.

8. A process for efficiently transmitting data from a Host to a multifunction peripheral, the multifunction peripheral comprising a display, a user input device, a processor, a first memory for long term storage and a second rewritable memory for short term storage, and a communications interface, the multifunction peripheral for providing document scanning and document output functions, the Host comprising a processor, a first rewritable memory for long term storage and a second rewritable memory for short term storage, a local I/O communications interface coupled to the communications interface of the multifunction peripheral by a communications channel, wherein the communications channel comprises one of the group consisting of Bidirectional Parallel and Asynchronous Serial, and when the Host has data to transfer to the multifunction peripheral, before the Host transmits a combined data packet, the Host executes a single SEND MESSAGE command, and a network adapter for communicating with a computer network, the process comprising the steps of:
   (a) the Host preparing first content packet from the data for transmission to the multifunction peripheral via the communications channel;
   (b) the Host preparing a first header packet containing information describing the first content, the first header packet having a predefined fixed length;
   (c) the Host combining the first content packet with the first header packet into the combined data packet;
   (d) the Host transmitting the combined data packet in a single transaction to the multifunction peripheral via the communications channel;
   (e) the multifunction peripheral receiving the combined data packet from the Host; and
   (f) the multifunction peripheral acknowledging receipt of the combined data packet to the Host.

9. The process for efficiently transmitting data from a Host to a multifunction peripheral as set forth in claim 8, wherein the multifunction peripheral comprises plural functional subsystems.

10. The process for efficiently transmitting data from a Host to a multifunction peripheral as set forth in claim 9, wherein the functional subsystems include an operator console, a resource manager, a printer and a scanner.

11. The process for efficiently transmitting data from a Host to a multifunction peripheral as set forth in claim 9, wherein each functional subsystem is assigned a distinct logical address, and the Host includes one of the logical addresses in the first header packet portion of the combined data packet, whereby the multifunction peripheral is able to internally route the received content data to the functional subsystem thereby addressed.

12. The process for efficiently transmitting data from a Host to a multifunction peripheral as set forth in claim 8 wherein if the multifunction peripheral signals to the Host that the multifunction peripheral is unable to accept the combined data packet, the Host retrying to transmit the combined data packet in a single transaction to the multifunction peripheral via the communications channel.

13. The process for efficiently transmitting data from a Host to a multifunction peripheral as set forth in claim 8, the process further comprising the steps of:
   (a) the Host preparing second content from the data for transmission to the multifunction peripheral;
   (b) the Host preparing a second header containing information describing the second content;
   (c) the Host combining the second content with the second header into the combined data packet to the multifunction peripheral for transmission with the first header and the first content.

14. The process for efficiently transmitting data from a Host to a multifunction peripheral as set forth in claim 8 further comprising the step of the Host receiving the content data from the computer network via the network adapter in the Host.

15. A process for efficiently transmitting data from a multifunction peripheral to a Host, the multifunction peripheral comprising a display, a user input device, a processor, a first memory for long term storage and a second rewritable memory for short term storage, and communications interface, the multifunction peripheral for providing document scanning and document output functions, the Host comprising a processor, a first rewritable memory for long term storage and a second rewritable memory for short term storage, a local I/O communications interface coupled to the communications interface of the multifunction peripheral by a communications channel, wherein the communications channel comprises one of the group consisting of Bidirectional Parallel and Asynchronous Serial, and when the multifunction peripheral has data to transfer to the Host, before the multifunction peripheral transmits a combined data packet, a GET MESSAGE command is executed, and a network adapter for communicating with a computer network, the process comprising the steps of:
   (a) the multifunction peripheral preparing a first content packet from the content data for transmission to the Host via the communications channel;
   (b) the multifunction peripheral preparing a first header packet containing information describing the first content packet, the first header packet having a predefined fixed length;
   (c) the multifunction peripheral combining the first content packet with the first header packet into the combined data packet;
   (d) the multifunction peripheral transmitting the combined data packet in a single transaction to the Host via the communications channel;
   (e) the Host receiving the combined data packet from the multifunction peripheral; and (f) the Host acknowledging receipt of the combined data packet to the multifunction peripheral.

16. The process for efficiently transmitting data from a Host to a multifunction peripheral as set forth in claim 15 wherein if the Host signals to the multifunction peripheral that the Host is unable to accept the combined data packet, the multifunction peripheral retrying to transmit the combined data packet in a single transaction to the Host via the communications channel.

17. The process for efficiently transmitting data from a multifunction peripheral to a Host as set forth in claim 15, the process further comprising the steps of:

(a) the multifunction peripheral preparing second content from the data for transmission to the Host;

(b) the multifunction peripheral preparing a second header containing information describing the second content;

(c) the multifunction peripheral combining the second content with the second header into the combined data packet to the Host for transmission with the first header and the first content.

18. A data processing system comprising a single Host coupled by a local I/O communications channel to a single multifunction peripheral, the system comprising:

the multifunction peripheral comprising a display, a user input device, a processor, a first memory for long term storage and a second rewritable memory for short term storage, and a communications interface, the multifunction peripheral for providing document scanning and document output functions;

the Host comprising a processor, a first rewritable memory for long term storage and a second rewritable memory for short term storage, a communications interface, and a network adapter for communicating with a computer network;

the communication channel comprises one of the group consisting of Bidirectional Parallel and Asynchronous Serial, the data processing system including means for detecting when the multifunction peripheral has data to transfer to the Host, and means for executing a single GET MESSAGE command before the multifunction peripheral transmits a combined data packet to the Host, coupling the communications interface of the multifunction peripheral and the communications interface of the Host;

the multifunction peripheral including software for causing the processor in the multifunction peripheral and the communications interface in the multifunction peripheral to:

(i) prepare a first content packet from the data for transmission to the multifunction peripheral via the communications channel;

(ii) prepare a first header packet containing information describing the first content packet;

(iii) combine the first content packet with the first header packet into the combined data packet;

(iv) transmit the combined data packet in a single transaction to the Host via the communications channel;

the Host including software for causing the processor in the Host and the communications interface in the Host to:

(i) receive the combined data packet from the multifunction peripheral;

(ii) send an acknowledgment of receipt of the combined data packet to the multifunction peripheral via the communications channel.

19. A data processing system comprising a single Host coupled by a local I/O communications channel to a single multifunction peripheral, the multifunction peripheral comprising a display, a user input device, a processor, a first memory for long term storage and a second rewritable memory for short term storage, and a communications interface, the multifunction peripheral for providing document scanning and document output functions;

the Host comprising a processor, a first rewritable memory for long term storage and a second rewritable memory for short term storage, a communications interface, and a network adapter for communicating with a computer network;

the communications channel coupling the communications interface of the multifunction peripheral and the communications interface of the Host;

the multifunction peripheral including software for causing the processor in the multifunction peripheral and the communications interface in the multifunction peripheral to:

(i) prepare a first content packet from the data for transmission to the multifunction peripheral via the communications channel;

(ii) prepare a first header packet containing information describing the first content packet;

(iii) combine the first content packet with the first header packet into a combined data packet;

(iv) transmit the combined data packet in a single transaction to the Host via the communications channel;

the Host including software for causing the processor in the Host and the communications interface in the Host to:

(i) receive the combined data packet from the multifunction peripheral;

(ii) send an acknowledgment of receipt of the combined data packet to the multifunction peripheral via the communications channel.

20. The data processing system comprising a single Host coupled by a communications channel to a single multifunction peripheral as set forth in claim 19, the software in the Host further for causing the processor in the Host and the communications interface in the Host to, if the Host is unable to accept the combined data packet, then send a message of inability to receive the combined data packet to the multifunction peripheral via the communications channel;

the software in the multifunction peripheral further for causing the processor in the multifunction peripheral and the communications interface in the multifunction peripheral to:

receive the message of inability to receive the combined data packet from the Host, and retry transmitting the combined data packet in a single transaction to the Host via the communications channel.

21. The data processing system comprising a single Host coupled by a communications channel to a single multifunction peripheral as set forth in claim 19:

the software in the multifunction peripheral further for causing the processor in the multifunction peripheral and the communications interface in the multifunction peripheral to:

(a) prepare a second content packet from the data for transmission to the Host;
(b) prepare a second header packet containing information describing the second content;
(c) combine the second content packet with the second header packet into the combined data packet for transmission in the single transaction to the Host with the first header and the first content.

22. The data processing system comprising a single Host coupled by a communications channel to a single multifunction peripheral as set forth in claim 19, the software in the Host further for causing the processor in the Host and the network adapter in the Host to transmit the content data to the computer network.

* * * * *